United States Patent [19]

Peterson

[11] 4,028,601
[45] June 7, 1977

[54] MULTI-LOOP DIRECT CURRENT MOTOR REGULATING SYSTEM PROTECTED AGAINST WINDUP BY A CLAMP CIRCUIT

[75] Inventor: Robert S. Peterson, Williamsville, N.Y.

[73] Assignee: Westinghouse Electric Corporation, Pittsburgh, Pa.

[22] Filed: May 23, 1975

[21] Appl. No.: 580,381

[52] U.S. Cl. .............................. 318/271; 318/308; 318/387; 318/430
[51] Int. Cl.² ......................................... H02P 7/30
[58] Field of Search .......... 318/271, 308, 327, 332, 318/337, 430, 434, 387

[56] References Cited

UNITED STATES PATENTS

| 3,508,132 | 4/1970 | Peterson | 318/271 |
| 3,900,781 | 8/1975 | Smith et al. | 318/271 |

*Primary Examiner*—Robert J. Hickey
*Attorney, Agent, or Firm*—C. M. Lorin

[57] ABSTRACT

A regulating system for direct current motor control having an inner and an outside loop is prevented from winding up in the outside loop, when the inner loop saturates, by a clamping circuit storing the value of the controlling voltage of the outside loop reached at the moment of saturation and generating an overriding error signal by reference to said stored value for providing effective control after saturation has ended.

6 Claims, 7 Drawing Figures

MULTI-LOOP DIRECT CURRENT MOTOR REGULATING SYSTEM PROTECTED AGAINST WINDUP BY A CLAMP CIRCUIT

BACKGROUND OF THE INVENTION

As generally known, the speed of a direct current motor drive may be controlled by changing either the counter E.M.F. of the motor, or the flux. The present invention, when applied to DC motor speed regulation, utilizes armature voltage for field flux control.

One conventional mode of controlling the speed of a DC motor is to control motor terminal voltage with the motor field excitation being kept fixed and the required amount of power of the motor being supplied by a direct current generator.

Another conventional mode of controlling the speed of a motor is normally to operate the motor at a lower speed level corresponding to base speed and to increase the speed above such level by decreasing the field current so as to decrease the counter E.M.F. and increase the armature current, thus the speed.

A speed regulating system of a DC motor can be of the multi-loop type, including an armature current regulation loop and a speed regulating loop. The speed loop is operative in response to a speed reference signal and a speed signal from the tachometer and includes a speed controller for fixing the level of speed to be reached, or maintained. The current loop operates with the armature current through a current transducer and a current controller in order to keep the armature current between strict limits.

A speed regulating system includes at least two such regulating loops, and proper control operation requires that each loop be effective in controlling the system independently of the other. However, in such systems operation of one loop is controlled by summing up the input signal from one loop with the output signal from the other loop. In other words one loop is outside the other. Thus the inner feedback loop may be an armature current loop, or a field current loop. In such instances, the response of the system is limited by the windup characteristic of the outside controller, which may be the speed controller, or even two controllers may cause winding up for instance by the speed and the armature current controllers.

Windup occurs in an outside controller when its output voltage signal continues to change while the inner controller has reached its limit value, e.g. has become saturated. If the outside controller which is winding up contains energy storage elements such as an integrator, unless the stored energy is discharged the outside controller will be unable to follow the controlling events, and when the inner controller recovers from saturation proper control by the system cannot resume. This is a particularly critical situation when the DC motor is controlled by a field exciter working through a large field time delay. This is the case with the generator field exciter when a generator is coupled to the motor, or with the motor field exciter when the motor is supplied from the DC power supply. In such situation, the windup voltage of the speed controller, which represents armature current loop reference, causes the armature current to become too high, thus causing the speed regulator to overshoot. The time required to bring the outside controller back into controlling range causes an over-correction in the regulator system. If the over-correction is excessive, the regulator will automatically force an under-correction to be made thus causing the controller to windup in the opposite direction. As a result oscillation can occur, which oscillation may even be sustained. While a regulator system can be stable for small disturbances, it may break into oscillations for larger disturbances as a result of controller windup, especially with the field time delays encountered in practice which are of the order of 0.5 seconds, or more. This problem can be minimized by forcing the field on the field exciter (associated with the generator or motor depending on the particular regulating system) by providing a larger exciter saturation voltage or by slowing down the outside regulating loop sufficiently to prevent windup of the outside controller. On the one hand increasing the field exciter maximum voltage is an expensive solution, and usually not a practical one. On the other hand, slowing down the outside regulator loop is not an ideal solution either. If the regulators are made slow so that oscillations of the system due to controller windup no longer occur, the overall performance of the DC motor is reduced. For instance in a steel mill this represents a sacrifice in tons of production per hour. The millstand speed regulators as a result of the limiting factor introduced in the regulator response no longer react to small disturbances. Typically when the mill is being threaded the small disturbances are not corrected and strip breakage or "off" gauge strip, occur more often than not, because most load disturbancs in the drive system are small while the regulator response to such disturbances is not limited by the field exciter saturation voltage. Thus, slowing down of the speed regulator response is not the right approach to the problem.

Reference can be made to U.S. Pat. No. 3,508,132 of R. S. Peterson entitled "Power Peak Circuiting Control for Direct Current Drives" issued on Apr. 21, 1970. This patent discloses a multi-loop speed regulating system for a direct current motor drive of the hoist type. The regulating system described includes 1) an inner armature current loop comprising a current transducer and a current controller providing control signal for generating a field current to a generator coupled to the D.C. motor drive 2) an outside speed control loop including a speed controller responsive to a reference signal and to the tachometer signal for generating a speed control signal to be summed up with the current transducer signal at the input of the current controller.

The excess speed developed in the system of the above-mentioned patent is used to check speed control. The present invention instead, bears upon a multi-loop regulating system in which excess current is used to check speed control.

SUMMARY OF THE INVENTION

The invention resides in storing the value reached by the controlling voltage of the outside control loop of a direct current motor regulating system at the moment when the inner control loop of the regulating system saturates and in generating during windup by the outside control loop an overriding error signal related to said value to promptly restore proper control of the motor after saturation of the inner control loop has ended.

DESCRIPTION OF THE PREFERRED EMBODIMENTS

The invention is described hereinafter in the context of (1) a speed regulator drive system for a direct current motor-generating unit, (2) a speed regulator drive system for a plurality of direct current motors supplied with current from a common direct current power supply and having respective individual exciters.

Figure 1:
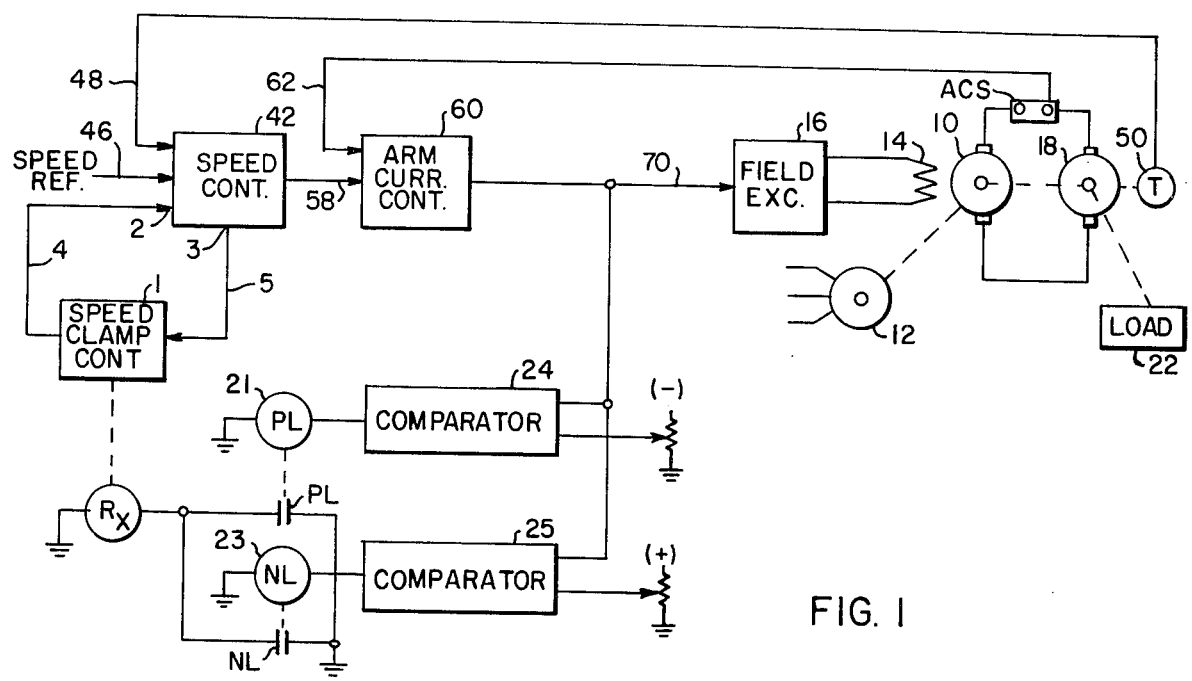
FIG. 1 is a block diagram of an illustrative embodiment of the motor control system of the invention in the situation where the speed of a direct current motor is controlled by controlling the motor terminal voltage with the motor field excitation being kept fixed and the required amount of power being supplid by a direct current generator.

FIG. 1 shows a conventional Ward-Leonard system comprising a direct current generator 10 coupled to a three-phase alternating current drive motor 12 which is, in turn, supplied with power from an external distribution system, not shown. The generator 10 is provided with a field winding 14 supplied from a thyristor power supply 16 the arrangement being such that the output from the generator 10 be a function of the field established by the thyristor power supply 16. The output of the generator 10 is then applied to a direct current motor 18 coupled through a mechanical linkage 20 to a load 22. A tachometer generator 50 is coupled to the shaft of motor 18.

A speed controller 42 is provided having a speed reference signal on lead 46, as one input, and a feedback voltage from the tachometer 50 on lead 48, as a second input. When the voltages on leads 46 and 48 do not cancel, the speed controller 42 can integrate the difference and the output on lead 58 will increase until through the speed loop the tachometer signal on line 48 matches the speed reference signal of line 46.

A current controller 69 is also provided having the signal on lead 58 from speed controller 42 as one input, and a signal on line 62 derived from an armature current sensor ACS, as second input. When the two inputs on leads 58 and 62 do not cancel each other, the current controller 60 can integrate the difference and its output 70 changes the field of generator 10, thus the current fed to motor 18, until a saturation limit is reached in either the positive or negative direction. When the sensed armature current is within these two limits the motor current is made to match the current indicated by the speed controller 42. The current can only get as large as the value set by these two limits. The output is then constant and, therefore, so also is the regulated current of the exciter of generator 10.

In the system just described, the speed controller 42 is part of an outside speed loop, while current controller 60 is part of an inner current loop. Windup occurs in the outside controller whenever its output voltage signal, on lead 58, continues to change while the inner controller 60 is already saturated. The speed controller contains energy storage elements which continue to store energy after the inner controller comes out of saturation. At such moment, it is desirable that the control voltage across the integrating capacitor of the speed controller be held at its present value until the armature current controller comes out of saturation, thus preventing the current controller integrator capacitor voltage from increasing (winding up).

The present invention provides a clamp controller associated with outside control loop, here a speed controller which is actuated when the current controller goes into saturation and which is effective to prevent windup from happening. Such clamp controller is shown on FIG. 1 in the form of a speed clamp controller 1 connected to the speed controller 42 via respective leads 4, 5, where lead 4 goes to an input terminal 2 of the speed controller and lead 5 is derived from an output terminal 3 of the speed controller 42. A limit relay $R_x$ is provided which is energized by relay contacts PL, or NL, of a plus limit detector 21 and a negative limit detector 23, respectively. Detectors 21 and 23 are actuated by comparators 24 and 25 respectively. Comparator 24 is operative when the signal on line 70 is at the positive limit, e.g. the current controller is positively saturated, while comparator 25 is operative when the current controller 60 is at its negative limit. Relay $R_x$ when actuated opens or closes electrical contacts within the circuit of speed clamp controller 1 as will be seen hereinafter.

Figure 2:
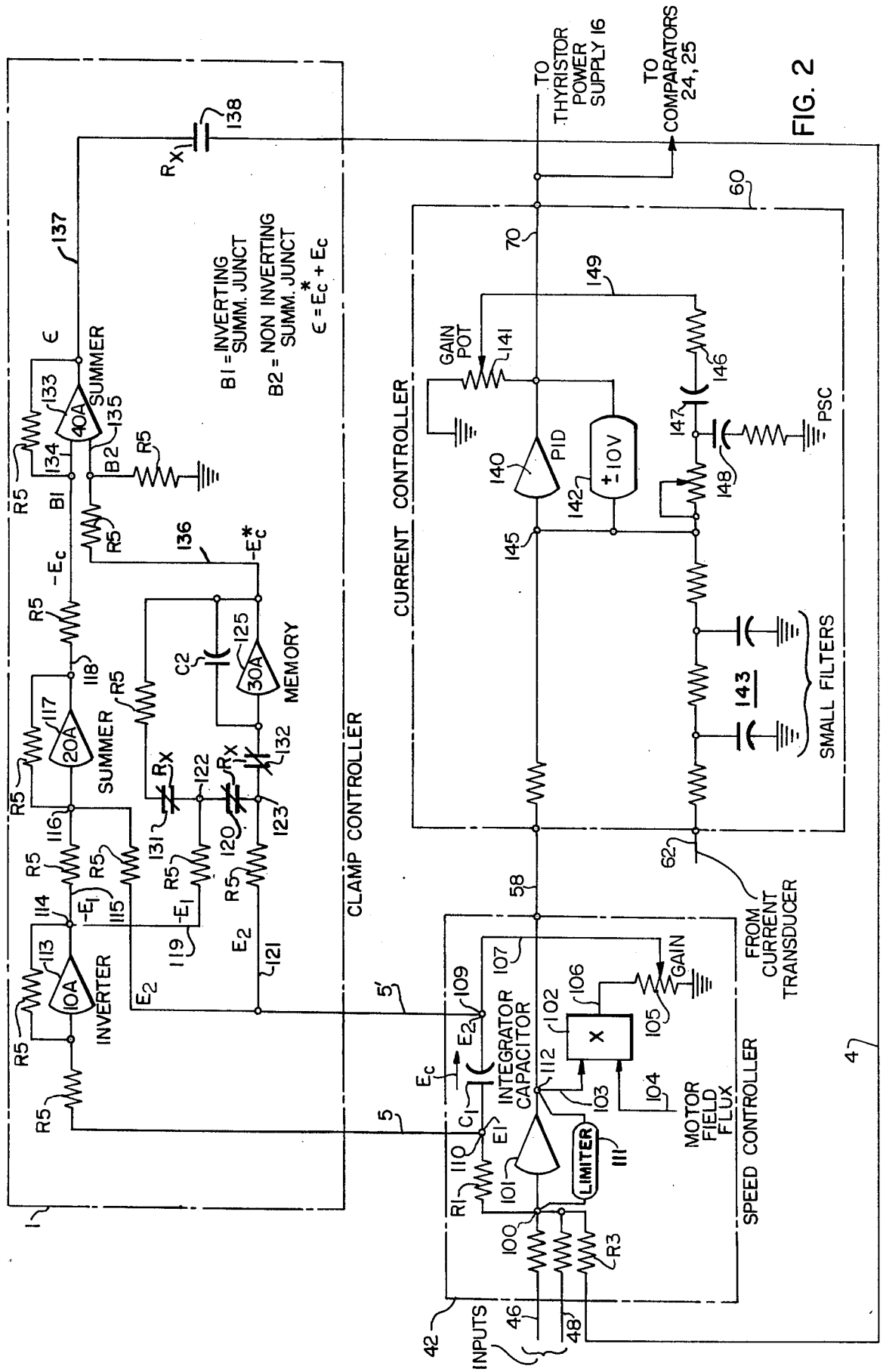
FIG. 2 is a detailed schematic diagram of the clamp controller circuit according to the present invention in relation with a speed controller circuit and a current controller circuit that can be used in the system of FIG. 2.

Referring to FIG. 2, the internal circuit of clamp controller 1 is shown in relation with the internal circuitry of speed controller 42. The speed controller is of the proportional, integral type (P,I), where resistor $R_1$ is the characteristic of proportionality and $C_1$ is the integrator capacitor, both inserted in series into the feedback path of an operational amplifier 101. The feedback path includes a multiplier 102 which has for input the output lead 103 from the operational amplifier 101 and a signal representing the motor field flux derived on led 104 for proper operation when a field weakening method is used. The output 106 of multiplier 102 is connected to one end of a potentiometer 105, the arm of which is used to adjust the gain of amplifier 101. Lead 107 from the arm of potentiometer 105 is connected to junction point 109 at one end of capacitor $C_1$. Junction point 110 is found between resistor $R_1$ and the other end of capacitor $C_1$. A limiter 111 is, in a conventional fashion, connected between the input and the output of operational amplifier 101. At the input of the operational amplifier 101 junction 100 is the summing point of input leads 46 and 48 belonging to the outside speed loop. At the output of the amplifier, junction point 112 is connected to the input lead 58 of the armature current controller 60, and to input lead 103 of multiplier 102. Depending upon the inputs to summing point 100, and the adjustment by potentiometer 105, capacitor $C_1$ assumes a potential $E_c$ between junction points 110 and 109. The potential at junction 110 is $E_1$. The potential at junction 109 is $E_2$. Thus $E_c = E_1 - E_2$ which thus designates the voltage across the speed controller integrator capacitor $C_1$.

The clamp controller 1 includes an inverting operational amplifier 113 connected at the input to junction point 110 via lead 5 and a resistor, so that at the output 114 potential $-E_1$ is derived which is then applied on lead 115 through another resistor to the input 116 of a summing operational amplifier 117. Junction point 109 is connected via lead 115 and a resistor to the summing input 116 of amplifier 117 so that at the input of amplifier 117 a signal representing $E_1-E_1$ is, in fact, applied. Therefore, on lead 118, at the output of amplifier 117, a signal representative of $-E_c$ is derived. The clamping circuit according to the present invention originates at the two ends 109, 110 of capacitor $C_1$ and via lines 5 and 5' voltage $E_c$ there derived is also converted by operational amplifier 113 into a difference voltage $E_2-E_1$ between leads 119 and 121, since potential $-E_1$ appears on lead 119 from output 114 and potential $E_2$ is directly derived from lead 5' and appears on lead 121. Lead 119 is connected at one end 122 via a resistor to one end of break contacts 120 belonging to relay $R_x$. Similarly, lead 121 is connected at the other end of break contacts 120 also via a resistor.

An operational amplifier 125 having a feedback path including a capacitor $C_2$ has its input connected to junction point 123 via a pair of closing contacts 132 also belonging to relay $R_x$. The output of operational amplifier 125 is connected to junction point 122 via a resistor and another pair of break contacts 131 also belonging to relay $R_x$. It appears that when relay $R_x$ is at rest, the break contacts of the relay are closed thus capactitor $C_2$ is being charged at a potential represented by $E_2-E_1=E_c$. In other words, at any given time, when relay $R_x$ is at rest, capacitor $C_2$ assumes the same potential as capacitor $C_1$. However, should relay $R_x$ be actuated, then break contacts 131, 132 will open thus separating capacitor $C_2$ from junction points 122 and 123 and capacitor $C_2$ no longer follows the potentials on leads 119 and 121, e.g. between junction points 109, 110, that is the potential of capacitor $C_1$. In other words, the circuit of operational amplifier 125 and capacitor $C_2$ with the adjunct break contacts 131, 132 operates as a memory when relay $R_x$ has been actuated to hold the voltage of capacitor $C_2$ at the value assumed by capacitor $C_1$ when relay $R_x$ was being actuated upon. Relay $R_x$ is the limit relay of FIG. 1 which is capable of being actuated by limit detectors, 21 or 23, whenever the armature current controller reaches a level of saturation. If this happens, the memory circuit just described (FIG. 2) will in fact store the instantaneous value of the voltage on capacitor $C_1$ as voltage on capacitor $C_2$. The clamp controller 1, further includes a summing amplifier 133 having two inputs 134, 135 to which are applied respectively the output from amplifier 117, on lead 118, representing $-E_c$ as derived from capacitor $C_1$, and the output from amplifier 125, on lead 136, which is the memorized potential $-E_c^*$ after relay $R_x$ has become operative. Therefore, at the output 137 of summer 133 an error $\epsilon$ due to windup of the speed controller 42 is generated when relay $R_x$ has been actuated, where $\epsilon = -E_c^* + E_c$. The error signal so derived is applied via lead 4, through closing contacts 138 of relay $R_x$, to the summing point 100, at the input of the speed controller 42.

The feedback loop used for correction under the error signal $\epsilon$ includes amplifiers 113, 117 and 133. This error is due to windup appearing on capacitor $C_1$ and the windup representative voltage is compared by amplifier 133 to the reference signal provided by capacitor $C_2$. This feedback loop is s designed that it has a very fast response (of the order of 150 hz, for instance). Therefore the error signal appearing at junction point 100, at the input of the speed controller 42 will override the other signals which may be present on lines 46, 48.

In normal operation, the current controller not being saturated relay $R_x$ is at rest. Equal and opposite voltages appear of lines 118 and 136 at the input of the summing amplifier 133 since $B_1$ on lead 136 is an inverting summing junction, and $B_2$ on lead 135 is a noninverting summing junction. Therefore, normally no feedback signal is present on line 4, and control of the speed controller 42 from input leads 46, 48 is unaffected. Should there be some mismatch in the circuitry so that a low signal voltage would appear at the output of summer amplifier 133, closing contacts 138 of relay $R_x$ are open when relay $R_x$ is at rest thus insuring that no voltage signal is supplied on lead 4 to the speed controller 42.

The internal circuit of current controller 60 is also illustrated in FIG. 2. Lead 58 from the speed controller is connected to the input 145 of an operational amplifier 140 having, in the conventional way, a gain potentiometer 141 at the output and limiter 142 between its input and output. Lead 62 from the current transducer (FIG. 1) is also connected via a small filter 143 to the input 145 of the current controller. The arm of potentiometer 141 is connected via lead to a resistor 146 which is the characteristic of proportionality of the amplifier and a capacitor 147 defining the integrating characteristic of the amplifier. Both are in the feedback path of the amplifier. Another capacitor 148 is mounted in derivation relative to capacitor 147 in order to define the derivative characteristic of the amplifier 140. Thus the current controller 60 is of the PID type. The voltage signal derived at the output, in lead 70, is applied to the field exciter of generator 10, and also from lead 7 are derived the input signals (positive or negative) applied to comparators 24, 25 in relation to limit detectors 21 and 23 as shown in FIG. 1. Limiter 142 is defining two limit voltages $\pm 10$ volts beyond which the current controller saturates. Between these two limits, the response characteristic is preferably linear.

The inner controller output voltage which represents field exciter voltage is detected by voltage detectors 21, 23 (limit detector 21 for (+) exciter voltage saturation; limit detector 23 for (−) exciter voltage saturation) as shown in FIG. 1. When saturation occurs limit detector 21 or 23 close a corresponding pair of contacts PL, NL and relay $R_x$ is energized. The clamp controller 1 shown in FIG. 1, then clamps (capacitor $C_2$) the speed controller to the voltage ($C_2$) which the integrator capacitor $C_1$ of the outside speed controller had when the limit condition was detected. Operational amplifiers 113 and 117 which have a unity gain, measure the voltage across the speed controller integrator capacitor $C_1$ as seen in relation to FIG. 2. The amplifier 125 normally also measures the voltage across the integrator capacitor $C_1$. The output voltage $E_c^*$ of amplifier 125 lags the integrator capacitor voltage $E_c$ from amplifier 117 by a small time delay ($R_5C_2$) which is approximately 1 millisecond, thus negligible. When the out of limit condition is detected by one of the limit detectors, the amplifier 125 is disconnected from leads 119 and 121 break contacts 131, 132 of relay $R_x$ when the latter is energized by the limit detector (21 or 23). Therefore amplifier 125 operates at that moment as an integrator without any input signal. Thus, capacitor $C_2$ holds (memorizes) the speed controller integrator capacitor voltage $E_c^*$ measured at the time that the out of limit condition was detected. This voltage $E_c^*$ is now used as a reference voltage with the windup voltage on capacitor $C_1$ still being applied from amplifier 117 to amplifier 133. An error is detected by error amplifier 133. Since the voltage signals $-E_c^*$ and $-E_c$ have the same polarity, the reference signal $-E_c^*$ is applied to the summer 113 non-inverting summing junction $B_2$ and the feedback signal $-E_c$ is applied to the inverting summing junction $B_1$ of the summer 113, so that the summer output signal represents capacitor $C_1$ error voltage. The error voltage due to windup of capacitor $C_1$ is then applied on lead 4 through normaly open contact 7, 6 to input resistor $R_3$ of the speed controller 42 which will maintain the capacitor $C_1$ of voltage $E_c$ to $E_c^*$ as reference as long as the out of limit condition persists. The feedback loop consisting of speed controller, amplifiers 113, 117 and 133 is very fast (approximately 150 hz) and will override any other input signal coming into the speed controller. The speed controller output voltage will also be clamped to the value it had when the out of limitation condition was detected.

When the out of limit condition is over, relay $R_x$ is deenergized by contacts PL and NL and the speed clamp feedback loop is opened by contacts 130. Amplifier 125 will now follow closely the voltage across the integrator capacitor $C_1$ which is equal to the voltage across capacitor $C_2$ until another out of limit condition is detected by limit detector 21 or 23.

Figure 3A:
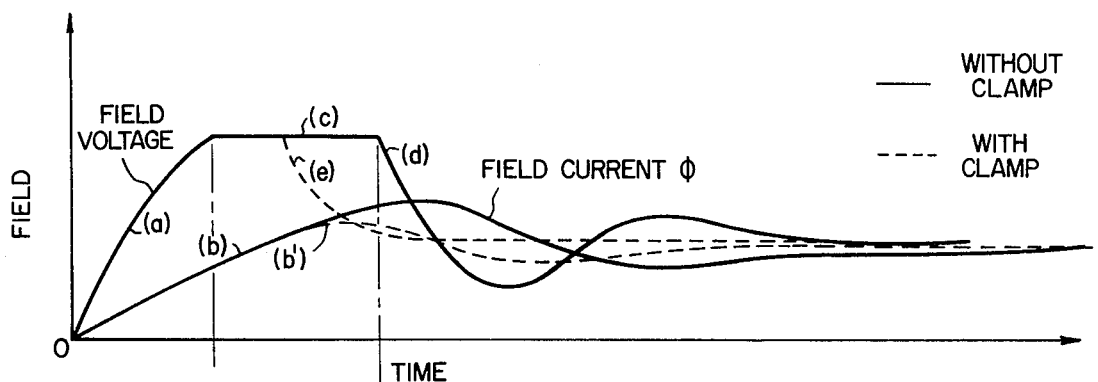
FIGS. 3A, 3B and 3C are graphs illustrating with curves the control operation of the system using clamping in accordance with the present invention (dotted lines) by comparison with a system not using clamping.

The operation of the clamp controller 1 can best be understood by reference to FIGS. 3A, 3B and 3C wherein the curves are as follows:

1. curves in FIG. 3A show the time relation between the field voltage derived on line 70 at the output of the armature current controller and the effective flux due to the field current as developed in the machine, with (dotted line) and without (solid line) clamping action.

Figure 3B:
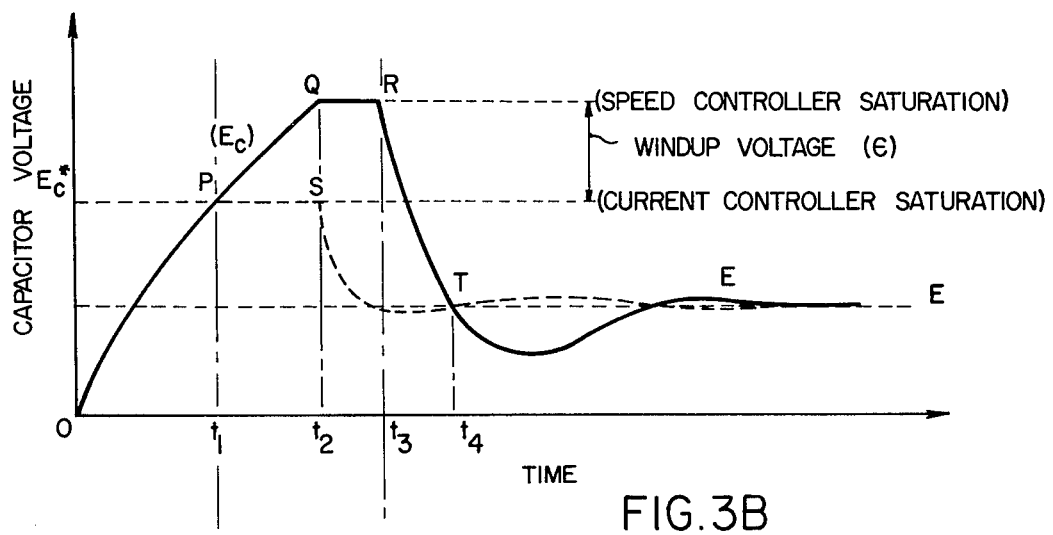

2. curves in FIG. 3B show the voltage $E_c$ of the integrating capacitor $C_1$ of the speed controller during windup and the reference voltage $E_c^*$ as memorized on capacitor $C_2$ during saturation.

Figure 3C:
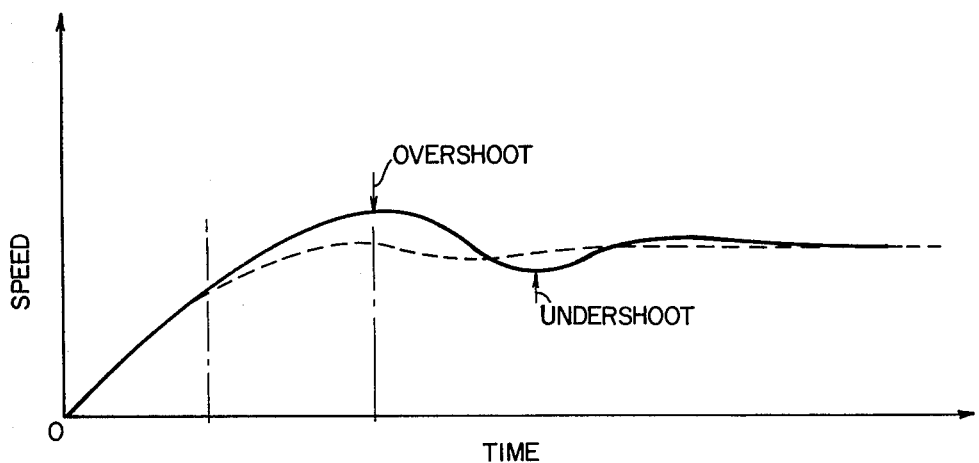

3. curves in FIG. 3C show the resulting speed control characteristics of the motor, with (dotted line) and without (solid line) the use of the clamp controller according to the present invention.

In the curves in FIG. 3A after following curve $a$ in the absence of a clamping circuit according to the invention, during saturation the field voltage holds at level $c$ until correction occurs when capacitor $C_1$ which has discharged too late, causes the current controller to follow curve $d$ down with undershooting toward the steady state. With a clamping circuit according to the present invention, the current controller will follow instead the dotted line $e$ toward the steady state without any undershooting and without any delay in control. Curves $b$ and $b'$ show effective field current adjustment on the generator.

Referring now to curves B, the speed controller integrates capacitor voltage $E_c$ as shown, and the curve increases after saturation from P to Q due to windup. From Q to R capacitor is held at the voltage reached, until it can discharge from R to E. Due to clamping capacitor $C_2$ the voltage developed on capacitor $C_1$ at instant $t_1$ of saturation of the current controller when relay $R_x$ was actuated (by detector 21 or 23 of FIG. 1) is memorized as a voltage $E_c^*$ which is held from P to S as indicated by a dotted line. Due to the error signal $E = E_c^* - E_c$ applied via line 4 to the speed controller, the armature current controller 42 after recovering from saturation is able to bring the field voltage quickly to the desired level along curve ST (in dotted line).

Curves in FIG. 3C show by comparison the effect of clamping (dotted line) on motor speed regulation.

Although the clamp controller has been discussed in the context of an inner loop which is a current loop and an outer loop which is a speed control loop, the clamp control concept can be applied to any outside controller of a multiloop regulator system in which an inner controller saturates.

Figure 5:
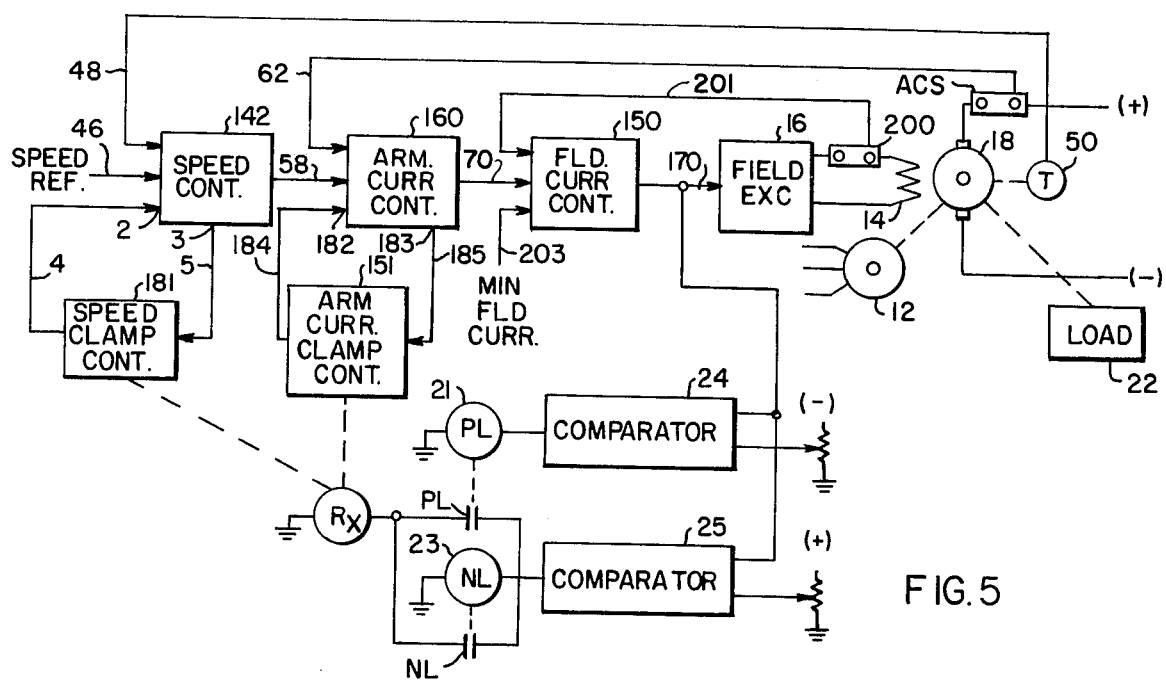
FIG. 5 is a block diagram of another illustrative embodiment of the motor control system of the invention in the situation where the speed of a direct current motor, such as one of the motors shown in FIG. 4, is normally operated at a lower speed level corresponding to base speed and the speed is increased above such level by decreasing the field current so as to decrease the counter E.M.F. and increase the armature current, thus the speed.
Figure 4:
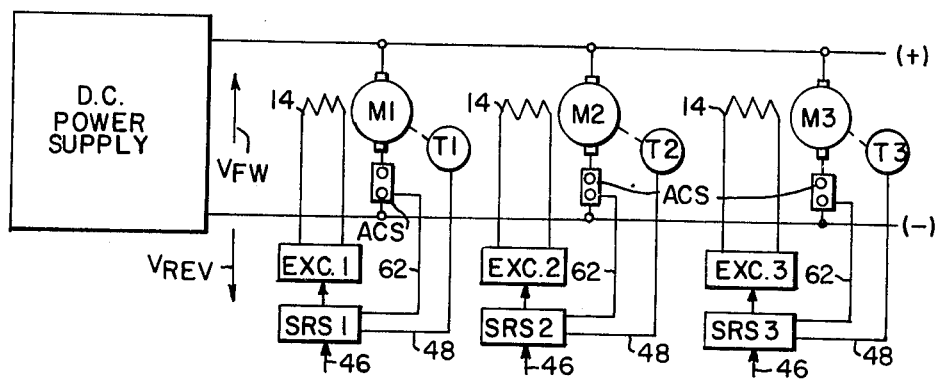
FIG. 4 shows as another embodiment of the present invention a system for controlling the speed of a plurality of direct current motors individually field controlled and supplid with power from common busses.

Referring to FIG. 4, a plurality of direct current motors $M_1$, $M_2$, $M_3$ are shown supplied from a direct current power supply on common busses. Each motor $M_1$, $M_2$, $M_3$ has a field exciter (EX1, EX2, EX3) amd a speed regulating system (SR1, SR2, SR3). Any or each of the speed regulating system, includes a clamp controller according to the present invention. Referring to FIG. 5, a typical speed regulating system appropriate to control any of motors $M_1$, $M_2$, or $M_3$ is shown as a multiloop system in which windup is prevented by a clamp controller in accordance with the present invention. The field exciter 16 of the motor is controlled by a voltage signal on line 170 like in the case of FIG. 1. However, such control signal is derived here from a field current controller 150, rather than from an armature current controller, as in the FIG. 1 situation. The field current is sensed by a current sensor 200 and feedback on lead 201 as an input to the field current controller. The control signal to the field current controller 150 is derived on line 70 from an armature current controller 160, such as the one shown in FIG. 2. In order to afford control of the motor at high speed by field weakening, a minimum field current signal is applied as a third input, on lead line 203, to the field current controller. The armature current sensor ACS of motor M provides on lead 62 an armature current feedback signal for the armature current controller 160. Thus the armature current loop belong to an outside loop current, rather than to an inner loop current. It is thus susceptible of winding up whenever the field current controller 150 saturates. Therefore, in accordance with the present invention, limit detectors such as 21 for the plus limit and 23 for the negative limit, are provided which are similar to those of like numbers in FIG. 1. These are actuated for either polarity from comparators 24, 25, respectively, which detect saturation in either direction from output lead 170 of the field current controller. Again a relay $R_x$ is provided which is actuated through contacts PL (positive limit), NL (negative limit) which belong to a correspondng one of the limit detectors 21, 23. An armature current clamp controller 151 is associated with the armature current controller 160 in the same fashion as the clamp controller 1 of FIGS. 1 and 3A–3C as associated with the outside speed loop in the FIG. 1 embodiment. The circuit of FIG. 5 further includes a speed controller 142 to which is associated a speed clamp controller 181 also like the clamp controller 1 of FIG. 1 of FIGS. 3A–3C. The same explanations given by reference to FIG. 1, or FIGS. 3A–3C, apply to the clamp controllers 181 and 151 of FIG. 5. The same reference numerals as in FIGS. 1 and 3A–3C are used in relaton to speed clamp controller 181 and speed controller 142 for the speed reference signal lead 46, the speed signal 48 from the tachometer 50, the overriding speed error signal $\epsilon$ on lead line 4 to the speed controller 142, when saturation of the field current controller 150 and winding up have occurred. Similarly, the armature current controller 160 is controlled during saturation of the field current controller 150 by a corresponding current error signal $\epsilon'$ derived on line 184 from the armature current clamp controller 151. Both circuits 181 and 151 can be built and are operative as earlier explained by reference to FIG. 2. Indeed, in the case of the armature current controller, line 185 corresponds to lines 5,5' in FIG. 2 carrying the voltage measured between the integrating capacitor 147 of the current controller (60 on FIG. 2) rather than the integrating capacitor $C_1$ of the speed controller (42 on FIG. 2).

Referring again to FIG. 2 with reference to the speed controller 42, the derivation of the open loop transfer for the clamp controller feedback loop can be shown as follows:

The actual speed signal on line 46 is $V_{in}$ while the overridng error speed signal $\epsilon$ is being applied on line 4 as a second input. The control voltage at the output e.g. on lead 58 is $V_{out}$. It is assumed that $\alpha$ is the gain as determined by potentiometer 105.

$$E_c = E_2 - E_1 = I_c \left[ \frac{1}{C_1 S} \right] \quad (1)$$

$$I_c = \alpha V_{out} \left[ \frac{1}{R_1 + \frac{1}{C_1 S}} \right] = \frac{\alpha V_{out} C_1 S}{R_1 C_1 S + 1}$$

$$E_c = \frac{\alpha V_{out} C_1 S}{R_1 C_1 S + 1} \left( \frac{1}{C_1 S} \right) = \frac{\alpha V_{out}}{R_1 C_1 S + 1}$$

From the basic operational amplifier equation it follows that:

$$\frac{\alpha V_{out}}{R_1 + \frac{1}{C_1 S}} + \frac{V_{in}}{R_v} + \frac{G}{R_3} = 0.$$

If solved for $\alpha V_{out}$:

$$\alpha V_{out} = -\epsilon \left[ \frac{R_1 C_1 S + 1}{R_3 C_1 S} \right] - V_{in} \left[ \frac{R_1 C_1 S + 1}{R_v C_1 S} \right] \quad (2)$$

From equation 2 into equation 1:

$$E_c = -\epsilon \left( \frac{1}{R_3 C_1 S} \right) - V_{in} \left( \frac{1}{R_v C_1 S} \right) \quad (3)$$

which is the transfer function of $E_c$ relative to $\epsilon$ and $V_{in}$.

Also from the basic operational amplifier equation it follows that:

$$V_{out} = -\epsilon \left[ \frac{R_1 C_1 S + 1}{\alpha R_3 C_1 S} \right] - V_{in} \left[ \frac{R_1 C_1 S + 1}{\alpha R_v C_1 S} \right]$$

If $E_c$ is not to change during out of limit condition then $\Delta E_c = 0$, or $$-\epsilon \left( \frac{1}{R_3 C_1 S} \right) = -V_{in} \left( \frac{1}{R_v C_1 S} \right)$$

or $$-\epsilon \left[ \frac{R_1 C_1 S + 1}{R_3 C_1 S} \right] = -V_{in} \left[ \frac{R_1 C_1 S + 1}{\alpha R_v C_1 S} \right]$$

which means that $\Delta V_{out} = 0$.

The conclusion is that the output voltage of the speed controller remains at the value it had prior to the out of limit condition detection.

What we claim is:

1. In a motor control system having at least an inner and an outside control loop, wherein said inner loop includes limiter means for holding the output control signal of said control system for said motor within a predetermined control level, the combination of:
   means responsive to limiting operation of said limiter means and operative with said outside loop for establishing an overriding error signal in relation to a control level existing in said outside loop upon initiation of said limiting operation; with said outside control loop including an input control signal representing a system variable and an integrator responsive to said input control signal for establishing a continuous integrated voltage characteristic of said control level for said system variable;
   with said overriding error signal establishing means including means normally responsive to said integrated voltage for storage thereof as a stored voltage; said storage means becoming non-responsive to said integrated voltage when said limiter means is under limiting operation.

2. The system of claim 1 with detecting means responsive to said output control signal and said predetermined control level for disconnecting said storage means from said integrator.

3. The system of claim 2 with said overriding error signal establishing means including means responsive said integrated voltage and to said stored voltage for algebraically summing signal characteristic of said integrated voltage and said storage voltage whereby in normal operation no substantial overriding error is supplied as input to said outside control loop, and a substantial overriding error signal is supplied thereto when said integrator is providing an integrated voltage substantially different from said stored voltage due to windup by said outside control loop.

4. The system of claim 3 comprising at least two outside control loops relative to said inner control loop, each outside control loop having an integrator responsive to a corresponding such said input control signal for establishing a corresponding continuous integrated voltage in relation of a corresponding system variable, and at least two such said overriding error signal establishing means respectively associated with said outside control loops, each responsive to the corresponding such said integrated voltage for storing a corresponding stored voltage, and wherein each said overriding error establishing means is operative in response to limiting operation of said inner loop.

5. The system of claim 1 with said inner loop being a current loop associated with field control of a generator coupled to said motor, and with said outside loop beng a speed control loop for said motor.

6. The system of claim 4 with said inner loop being a field current control loop associated with field control of said motor, and with one of said outside loops being an armature current control loop associated with said motor, and the other of said outside loops being a speed control loop for said motor.

* * * * *